(12) United States Patent
Nash et al.

(10) Patent No.: US 9,924,786 B2
(45) Date of Patent: Mar. 27, 2018

(54) UTILITY CLIP

(71) Applicant: Vernon E. Nash, Huber Heights, OH (US)

(72) Inventors: Vernon E. Nash, Huber Heights, OH (US); Sheldon E. Williamson, Dayton, OH (US)

(73) Assignee: Vernon E. Nash, Huber Heights, OH (US)

( * ) Notice: Subject to any disclaimer, the term of this patent is extended or adjusted under 35 U.S.C. 154(b) by 79 days.

(21) Appl. No.: 15/005,114

(22) Filed: Jan. 25, 2016

(65) Prior Publication Data

US 2016/0316901 A1   Nov. 3, 2016

Related U.S. Application Data

(60) Provisional application No. 62/154,269, filed on Apr. 29, 2015.

(51) Int. Cl.
*A45F 5/02* (2006.01)
*F16B 45/02* (2006.01)

(52) U.S. Cl.
CPC .............. *A45F 5/022* (2013.01); *F16B 45/02* (2013.01); *A45F 5/02* (2013.01)

(58) Field of Classification Search
CPC .... A45F 5/021; A45F 5/022; A45F 2005/025; A45F 2005/026; A45F 2200/0566
USPC ........ 224/268–269, 200, 660, 666–673, 251, 224/255–256, 904, 922, 198; 403/113, 403/116
See application file for complete search history.

(56) References Cited

U.S. PATENT DOCUMENTS

| 3,384,277 | A | | 5/1968 | Hodelka |
| 5,186,326 | A | * | 2/1993 | Peckels ..................... A45F 5/02 |
| | | | | 206/234 |
| 5,186,373 | A | | 2/1993 | Taylor |
| 5,232,137 | A | | 8/1993 | Devine |
| D404,643 | S | | 1/1999 | Walker |
| 6,612,471 | B2 | | 9/2003 | Sellars |
| 6,659,321 | B2 | | 12/2003 | Hartranft et al. |
| 6,688,505 | B1 | | 2/2004 | Bradley et al. |

(Continued)

OTHER PUBLICATIONS

Oliver-Garcia, Catherine R.; Notice of Allowance for U.S. Appl. No. 29/559,056; dated Feb. 16, 2017; United States Patent and Trademark Office; Alexandria, VA.

*Primary Examiner* — Scott McNurlen
(74) *Attorney, Agent, or Firm* — Thomas E. Lees, LLC (57) ABSTRACT

A utility device includes a base tapered at an edge and a clip. The clip includes a hook, and when in a closed position, the hook fits into a recess of the clip and is unable to receive an object. However, in an opened position, the hook is pivoted away from the clip and is able to receive an object. An abutment prevents the hook from opening further than the opened position. The clip further includes a channel with overhangs and retainers that prevent an attached corresponding rotatable attachment piece from detaching from the channel. The corresponding rotatable attachment piece may attach to the channel and rotate within the channel. However, a first and second set of stoppers limit the rotation of the corresponding rotatable attachment piece within the channel. Further, the utility device may include a slot offset from the base to receive a corresponding fixed attachment piece.

1 Claim, 11 Drawing Sheets

(56) References Cited

U.S. PATENT DOCUMENTS

| | | | |
|---|---|---|---|
| D583,549 S | 12/2008 | Schuyler | |
| 7,854,021 B2 | 12/2010 | Compton et al. | |
| D674,594 S | 1/2013 | Amorello et al. | |
| 8,484,813 B2* | 7/2013 | Taniguchi | A44B 17/0029 24/114.05 |
| 8,485,406 B2* | 7/2013 | Huh | A45F 5/021 224/241 |
| 8,919,623 B1* | 12/2014 | Bergeron | A45F 5/02 224/148.4 |
| 2003/0098323 A1* | 5/2003 | Taylor | A45F 5/02 224/197 |
| 2004/0251286 A1 | 12/2004 | Badillo | |
| 2005/0255898 A1 | 11/2005 | Huang | |
| 2005/0257353 A1* | 11/2005 | Rohrig | A45F 5/02 24/537 |
| 2006/0032877 A1 | 2/2006 | Obolo | |
| 2010/0287738 A1* | 11/2010 | Amsalem | A45F 5/04 24/3.6 |
| 2012/0152990 A1 | 6/2012 | Kulas | |

* cited by examiner

UTILITY CLIP

CROSS REFERENCE TO RELATED APPLICATIONS

This application claims the benefit of U.S. Provisional Patent Application Ser. No. 62/154,269, Apr. 29, 2015, entitled UTILITY CLIP, the disclosure of which is hereby incorporated by reference.

BACKGROUND

The present invention relates in general to a utility clip, and in particular, to a utility clip that quickly slips into a pocket of a user, and which provides multiple, alternative clip attachments that facilitates hands-free carrying of a plurality of items.

Various products are available for clipping a holder to a belt worn by a user. For instance, belt holders are known for carrying cellular telephones. Typically, the holder includes a pocket that includes a flap or a molded pouch. The holder also typically includes a spring-biased tension clip, hook, or loop that is mounted to the back of the pocket for attaching the holder to the belt of the user.

Moreover, various pocket holders are known. For instance, pocket inserts referred to as pocket protectors can be inserted into a shirt pocket for carrying pencils, notepads, and other objects. Also, pocket holders have been used to carry working implements such as hammers and other tools.

BRIEF SUMMARY

According to aspects of the present disclosure, a utility device includes a base tapered at an edge and a clip. The clip includes a hook pivotably selectable between a closed position and an opened position. In the closed position, the hook fits into a recess of the clip and is unable to receive an object. However, in the opened position, the hook is pivoted away from the clip and is able to receive an object. An abutment prevents the hook from opening further than the opened position.

According to further aspects of the present disclosure, the clip further includes a channel with overhangs that prevent an attached corresponding rotatable attachment piece from detaching lengthwise from the channel. The clip further includes retainers that prevent the attached corresponding attachment piece from detaching depthwise from the channel. The channel may receive a circular tab of the corresponding rotatable attachment piece such that the corresponding rotatable attachment piece may attach to the channel and rotate within the channel. Further, a first and second set of stoppers limit the rotation of the corresponding rotatable attachment piece within the channel.

According to still further aspects of the present disclosure, the utility device may include a slot offset from the base. The slot can optionally include a guiding feature, e.g., three sloped sides, to guide a corresponding fixed attachment piece. Moreover, the slot may include an interference fit locking mechanism to prevent the corresponding fixed attachment piece from detaching from the slot.

DETAILED DESCRIPTION

According to various aspects of the present disclosure, a hands-free holding device (i.e., a utility clip) includes a hook, a channel for accepting a rotatable attachment device, a slot for accepting a fixed attachment device, or any combination thereof. The hook may be used for holding items that may easily rest on a hook such as a key ring or a ring of a sunglasses case. The channel may accept a beverage container attachment device, a fishing pole attachment device, tool pouch attachment device, or any other rotatable attachment device. For example, a user may attach a beverage container attachment device to the channel and place a beverage can, beverage bottle, etc., in the beverage container attachment device. Then, the user may rotate the beverage container attachment device, and thus its contents, to remain upright regardless of whether the user is sitting or standing. As another example, the user may attach the fishing pole attachment device to the channel, and when a fish is on the line, the fishing pole may rotate forward to indicate a fish is on the line. Moreover, the slot may hold a fixed attachment device for a mobile phone, key ring or other device having a feature that suitably engages the slot. As such, any item coupled to an attachment device or placed on the hook may be transported hands-free.

Figure 1:
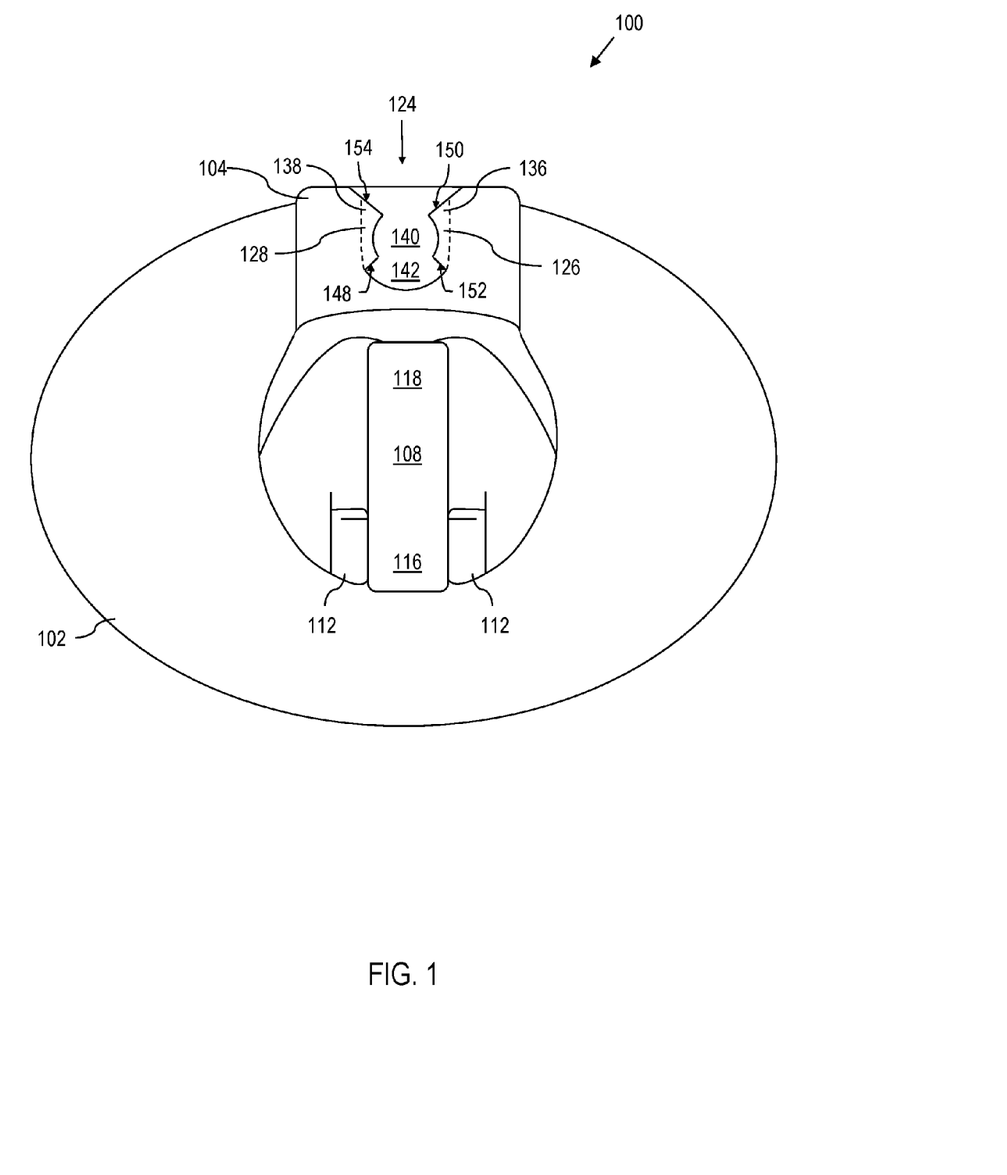
FIG. 1 is a front view of a hands-free utility device for carrying items, according to various aspects of the present disclosure.
Figure 2:
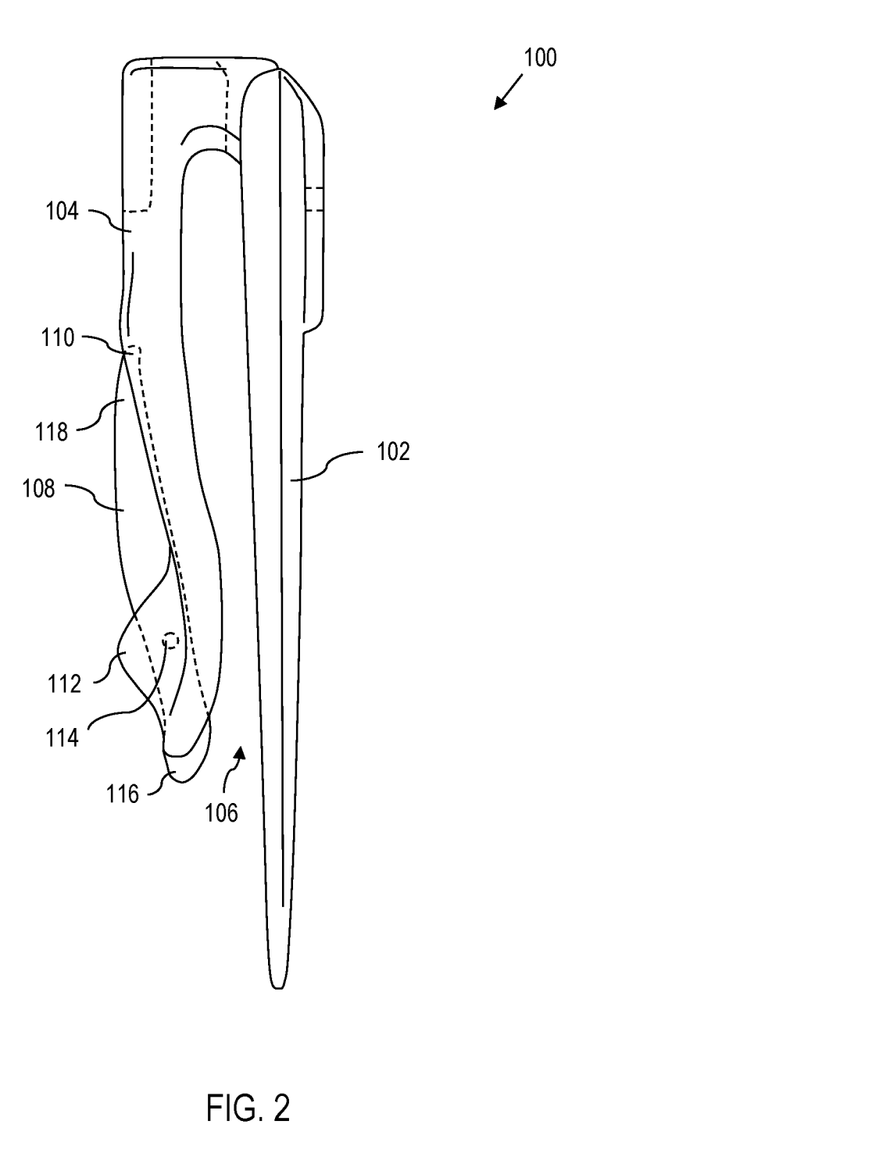
FIG. 2 is a side view of the hands-free utility device of FIG. 1 where a hook is in a closed position, according to various aspects of the present disclosure.

Turning now to FIGS. 1 and 2, a utility device 100 for allowing people to carry objects hands-free is shown. The device 100 includes a base 102 and a clip 104. In an example implementation, the base 102 and clip 104 are one integral piece, but such an arrangement is not necessary. Regardless, a gap 106 is formed between the base 102 and the clip 104, which is shown as being be narrower than the base 102. As shown in FIG. 1, the base is ovular, but any shape may be used. However, the base 102 should have more area than the clip 104 to spread out any weight attached to the clip 104 over a large area. As shown in FIG. 2, the base 102 is tapered at an edge; however, there is no requirement that the base 102 be tapered. Moreover, the base may be made of any suitable material. For example, the base 102 may be made of a rigid polymer, which helps distribute any weight attached to the clip 104.

When wearing the utility device 100, a user places the base 102 inside a pocket on an article of clothing (e.g., front pocket of jeans) while the clip 104 goes outside of the pocket, and a welt of the pocket fits inside the gap 106. Note that the gap 106 should be at least as deep as the welt of the pocket, but the gap 106 may be deeper than the welt of the pocket. In other words, the clip 104 and base 102 do not need to have a snug fit with the pocket. Moreover, the rounded and tapered geometry of the base 102 can be helpful in easing the insertion of the utility device 100 into certain pockets (e.g., tight pockets, angled pockets, etc.). For instance, in an example implementation, the base 102 has a major (larger) diameter of approximately 5 inches (about 12.7 centimeters) and a minor (smaller) diameter of approximately 3.5 inches (about 8.89 centimeters). However, other dimensions can be used.

Figure 3:
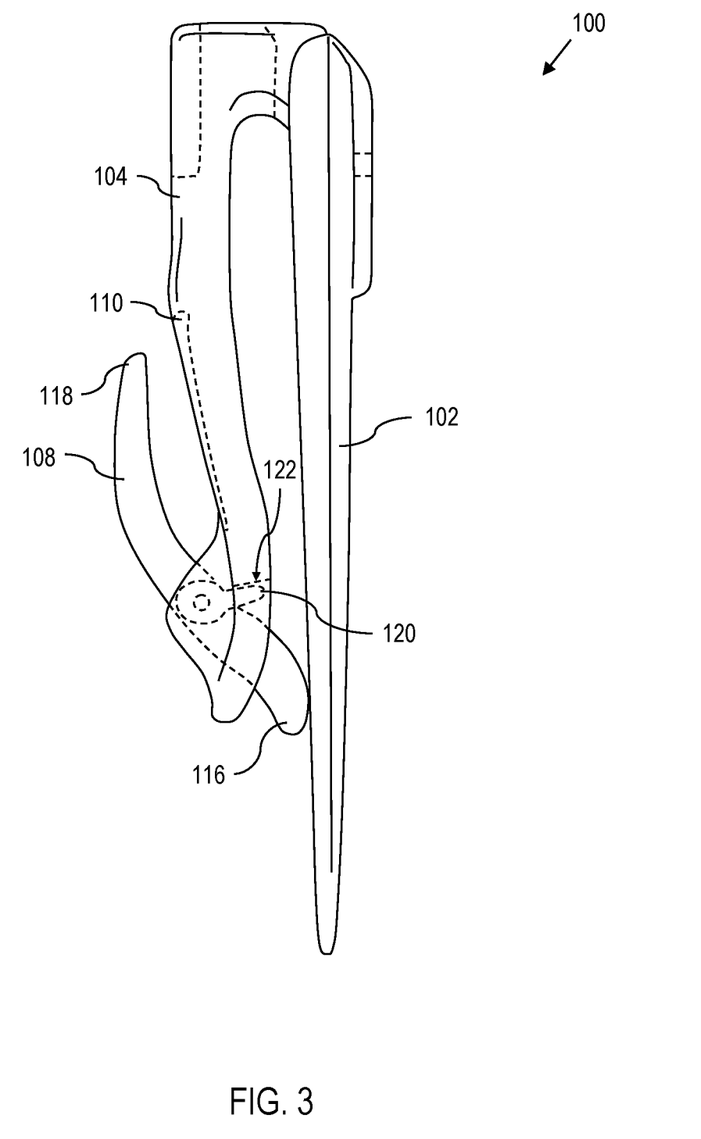
FIG. 3 is a side view of the hands-free utility device of FIGS. 1-2 where the hook is in an opened position, according to various aspects of the present disclosure.

The clip 104 includes a hook 108 that is selectable between two positions: a closed position (as shown in FIG. 2) and an opened position (as shown in FIG. 3). Further, the clip 104 includes a gusset 112 on both sides of the hook 108 to strengthen a fulcrum 114 on which the hook 108 pivots. As seen in FIG. 2, when the hook 108 is in the closed position, the hook 108 is at least partially within a recess 110 of the clip 104 and is unable to receive an associated object (e.g., a key ring, a sunglasses case, etc.). However, when the user presses on a bottom 116 of the hook 108 toward the base 102, the hook 108 pivots into the opened position, as shown in FIG. 3.

In the opened position, a top 118 of the hook 108 leaves the recess 110 of the clip 104. Thus, the top 118 of the hook 108 is pivoted away from the clip 104, and the bottom 116 of the hook 108 is pivoted toward the base 102. Further, the hook 108 includes a blocker 120 that contacts an abutment 122 on the clip 104 to prevent the hook 108 from opening further than the opened position. Moreover, the bottom 116 of the hook 108 may contact the base (or fabric of the pocket disposed in the gap (i.e., a welt)) as a secondary method of preventing the hook 108 from opening further than the opened position.

The user may place any reasonable object on the hook 108. Contact between the bottom 116 of the hook 108 and the base 102 spreads out any force generated by the object over the entire area of the base 102. For example, the user may place the base 102 in a front pocket of a pair of jeans and place a key ring over the hook 108. The weight of the key ring is transferred through the hook 108 to the base 102, where the weight is then spread out on the user's thigh, causing no discomfort.

Figure 4:
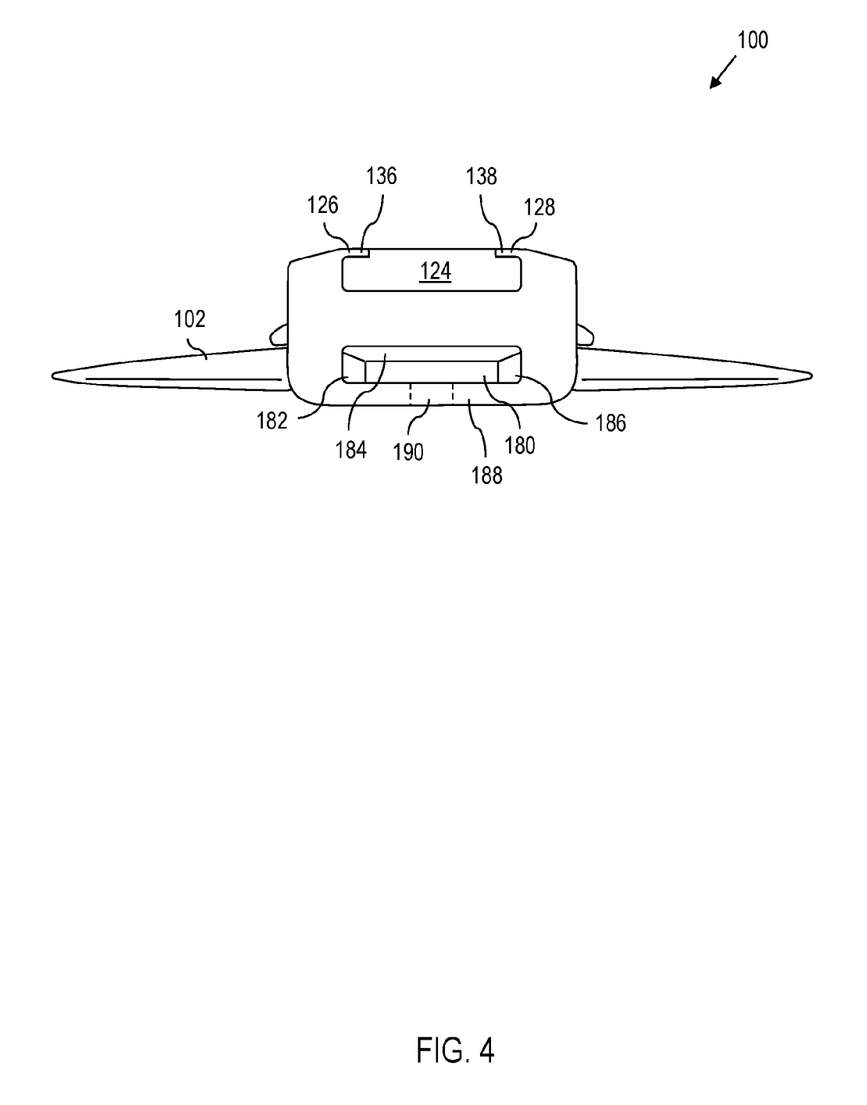
FIG. 4 is a top view of the hands-free utility device of FIGS. 1-3, according to various aspects of the present disclosure.
Figure 5:
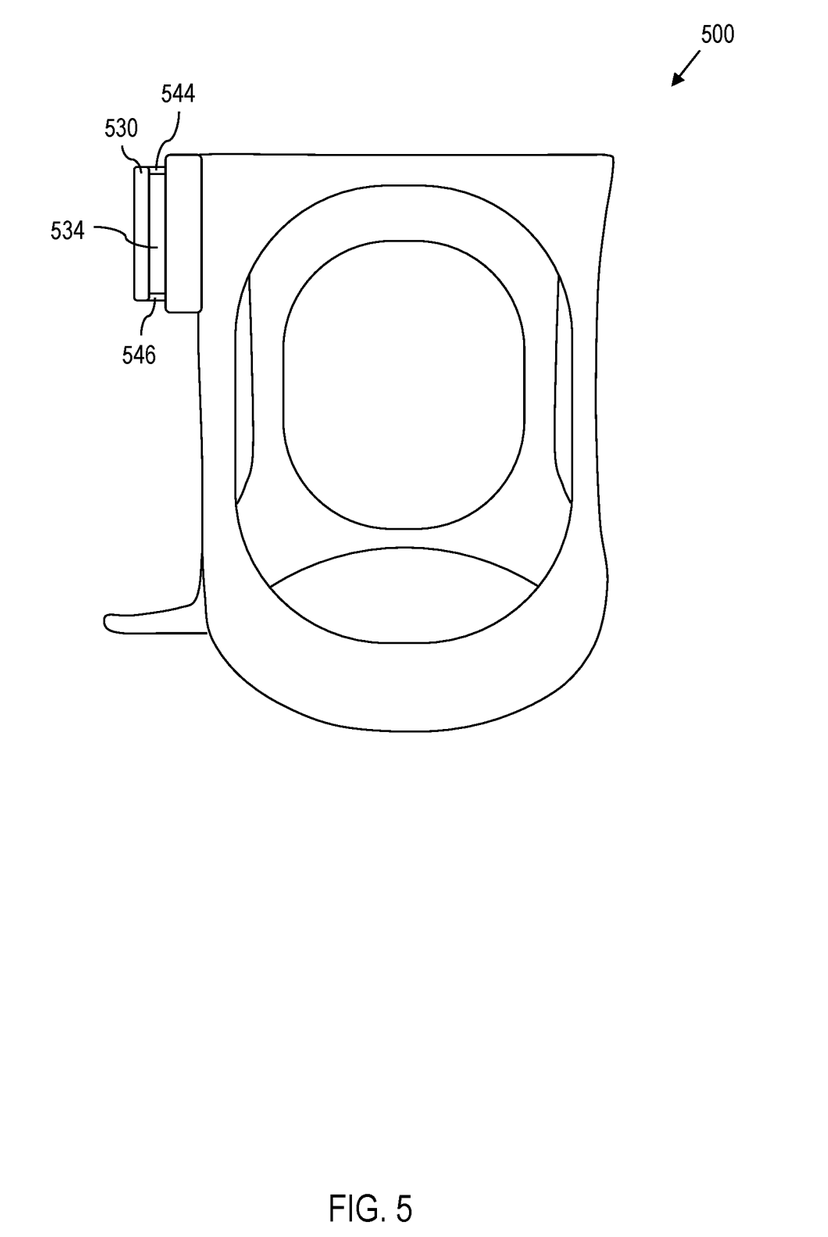
FIG. 5 is a side view of a rotatable attachment device corresponding to a channel of the hands-free utility device of FIGS. 1-4, according to various aspects of the present disclosure.
Figure 6:
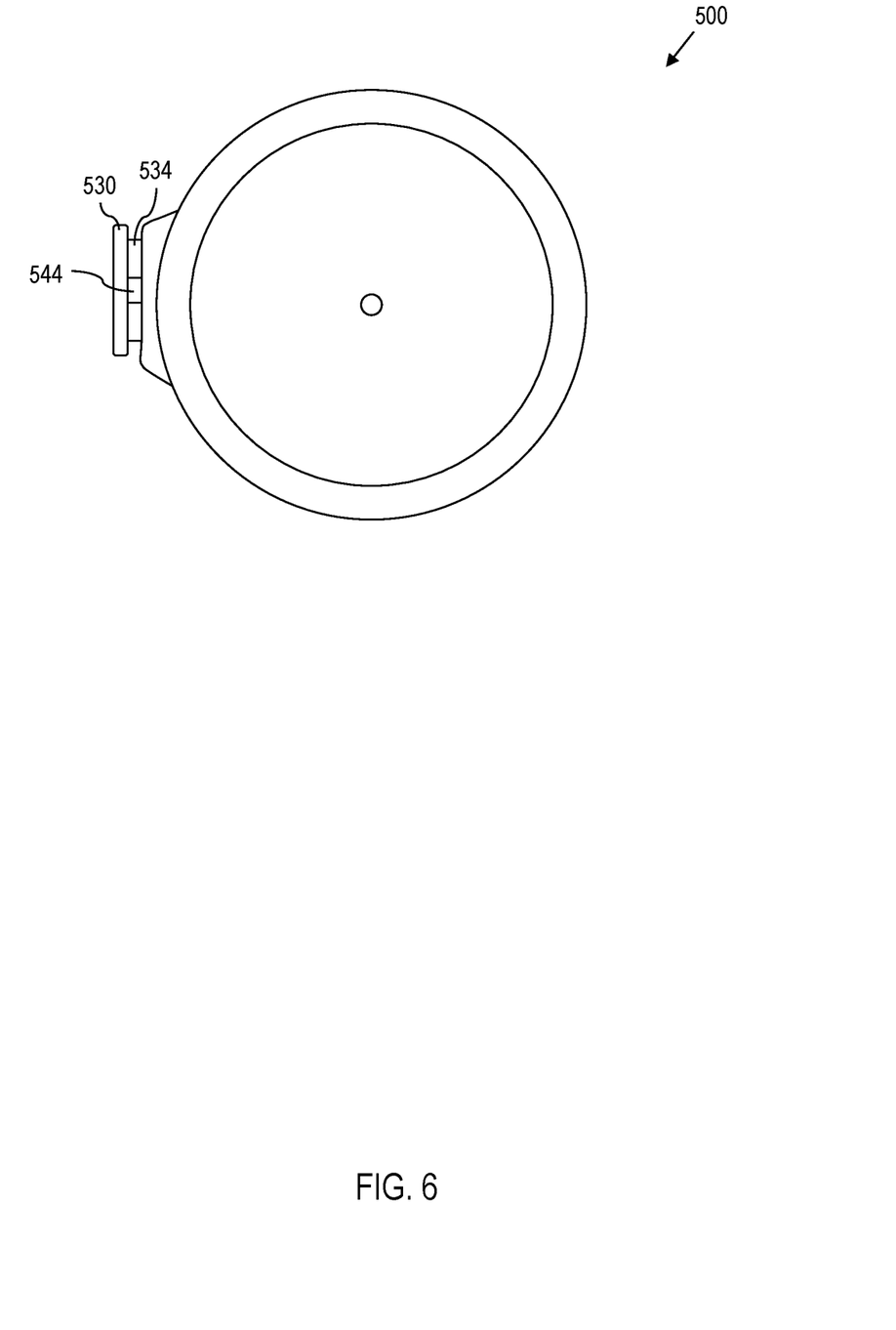
FIG. 6 is a top view of the rotatable attachment device of FIG. 5 corresponding to a channel of the hands-free utility device of FIGS. 1-4, according to various aspects of the present disclosure.

Turning back to FIG. 1 and with additional reference to FIGS. 4-6, the clip 104 further includes a channel 124 with overhangs 126, 128 that allow a circular tab 530 of a corresponding rotatable attachment piece 500 to be inserted into the clip 104. The depth of the channel 124 including the overhangs 126, 128 should be generally the same as the depth of the circular tab 530 and a shaft 134 of the corresponding rotatable attachment piece 500. To insert the tab 530 of the corresponding rotatable attachment piece 500 into the channel 124, the user must apply enough force to slide the shaft 534 past two retainers 536, 538 on the overhangs 126, 128. Once the corresponding rotatable attachment piece 500 is inserted into the channel 124, the retainers 536, 538 prevent the corresponding rotatable attachment piece 500 from detaching from the channel 124 in the direction in which the corresponding rotatable attachment piece 500 was attached to the channel (i.e., the lengthwise direction). Further, the overhangs 126, 128 prevent the corresponding rotatable attachment piece 500 from detaching from the channel 124 in a direction away from the clip (i.e., a depthwise direction).

The shape of the channel 124 including the overhangs 126, 128 creates two concentric, partially circular sections 140, 142 that allow the corresponding rotatable attachment piece 500 to rotate in a plane generally parallel to the clip 124. The first section 140 is defined by the radius of the shaft 134 of the corresponding rotatable attachment piece 500. Thus, the corresponding rotatable attachment piece 500 fits snugly within the channel and is allowed to rotate around a center point of the first section 140.

The second section 142 of the channel 124 has a radius based on the radius of the shaft 534 plus a height of a pin 544, 546. The larger radius is such that the corresponding rotatable attachment piece 500 may rotate within the channel 124, even though the pins 544, 546 are present.

However, the second section 142 includes two sets of stoppers 148, 150, 152, 154. For example, the first set of stoppers includes a first stopper 148 and a second stopper 150 radially across from each other. When the corresponding rotatable attachment piece 500 is rotated in the clockwise direction, the pins 544, 546 of the shaft 534 come into contact with the first set of stoppers 148, 150, and the corresponding rotatable attachment piece 500 may no longer be rotated in the clockwise direction.

Similarly, the second section 142 may include a second set of stoppers 152, 154 disposed radially across from each other. As shown in FIG. 1, the second set of stoppers 152, 154 is approximately ninety degrees from the first set of stoppers 148, 150; however, the sets of stoppers 148, 150, 152, 154 may be offset by any desired angle. Thus, when the corresponding rotatable attachment piece 500 is rotated in the counterclockwise direction, the pins 544, 546 of the shaft 534 ultimately come into contact with the second set of stoppers 152, 154, such that the corresponding rotatable attachment piece 500 may no longer be rotated in the counterclockwise direction. Therefore, the corresponding rotatable attachment piece 500 may be rotated ninety degrees minus the width of the pin 544, 546 within the clip 124 in this example implementation.

As shown in FIG. 5, there are two pins 544, 546 radially across from each other. However, in other embodiments, there may be more or less pins. For example, there may be only one pin 546 that is located at the bottom of the shaft (i.e., pin 544 is not present). In such a case, only two stoppers 148, 152 are needed. While it is possible to have only one pin 546, in certain applications, the one pin 546 should be on the bottom of the shaft 534, because if the pin 544 on the top of the shaft 534 is used instead, the force used to rotate the rotatable attachment piece 500 may create a fulcrum at the pin 544 and one of the stoppers 150, 154, and the circular tab 530 may come out of the channel 124.

Moreover, the pins 544, 546 may be wider than shown. For example, if the two sets of stoppers 148, 150, 152, and 154 are offset by ninety degrees and the pins 544, 546 are both forty degrees in width, then the rotatable attachment piece 500 may only rotate fifty degrees within the channel 124.

Still further, the pins 544, 546 do not need to be solid. For example, instead of the pins being thirty degrees wide, two protrusions may be placed thirty degrees apart, where the protrusions act as one pin. In such a case, then the rotatable attachment piece 500 may only rotate sixty degrees within the channel 124.

As shown in FIGS. 5 and 6, the corresponding rotatable attachment piece 500 is adapted to hold a beverage container (e.g., a can or a bottle). Thus, when the user is standing, the beverage container may be upright, but when the user sits down, the user may rotate the rotatable attachment piece 500 such that the beverage container is still upright.

Figure 7:
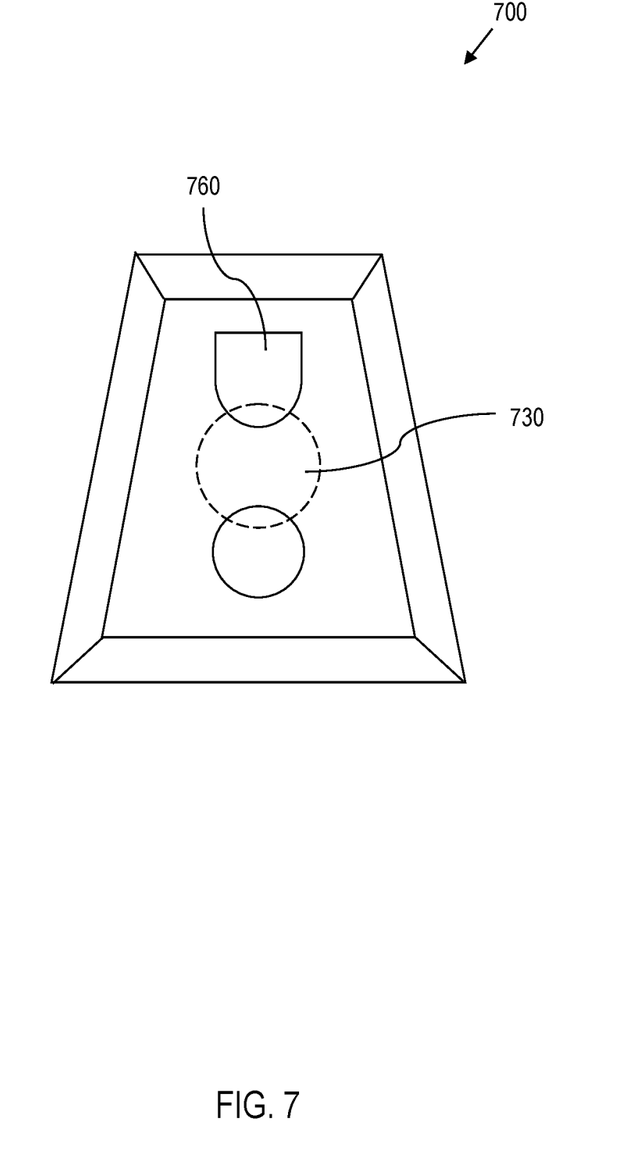
FIG. 7 is a front view of a tool pouch attachment device corresponding to a channel of the hands-free utility device of FIGS. 1-4, according to various aspects of the present disclosure.

FIG. 7 illustrates another attachment device 700 that may be fitted to a locking mechanism of a tool pouch. Basically, the locking mechanism of the tool pouch fits into a receptacle 760 of the attachment device 700. A back side of the attachment device 700 includes a rotatable tab 730 similar to the rotatable tab 530 of FIGS. 5 and 6. Thus, a user may easily attach and detach the tool pouch from the utility device as desired and may rotate the tool pouch within the utility device to adjust for different positions. Further, the tool-pouch rotatable attachment device 700 may take any desired shape and configuration that complements an attachment mechanism on a tool pouch.

Figure 8:
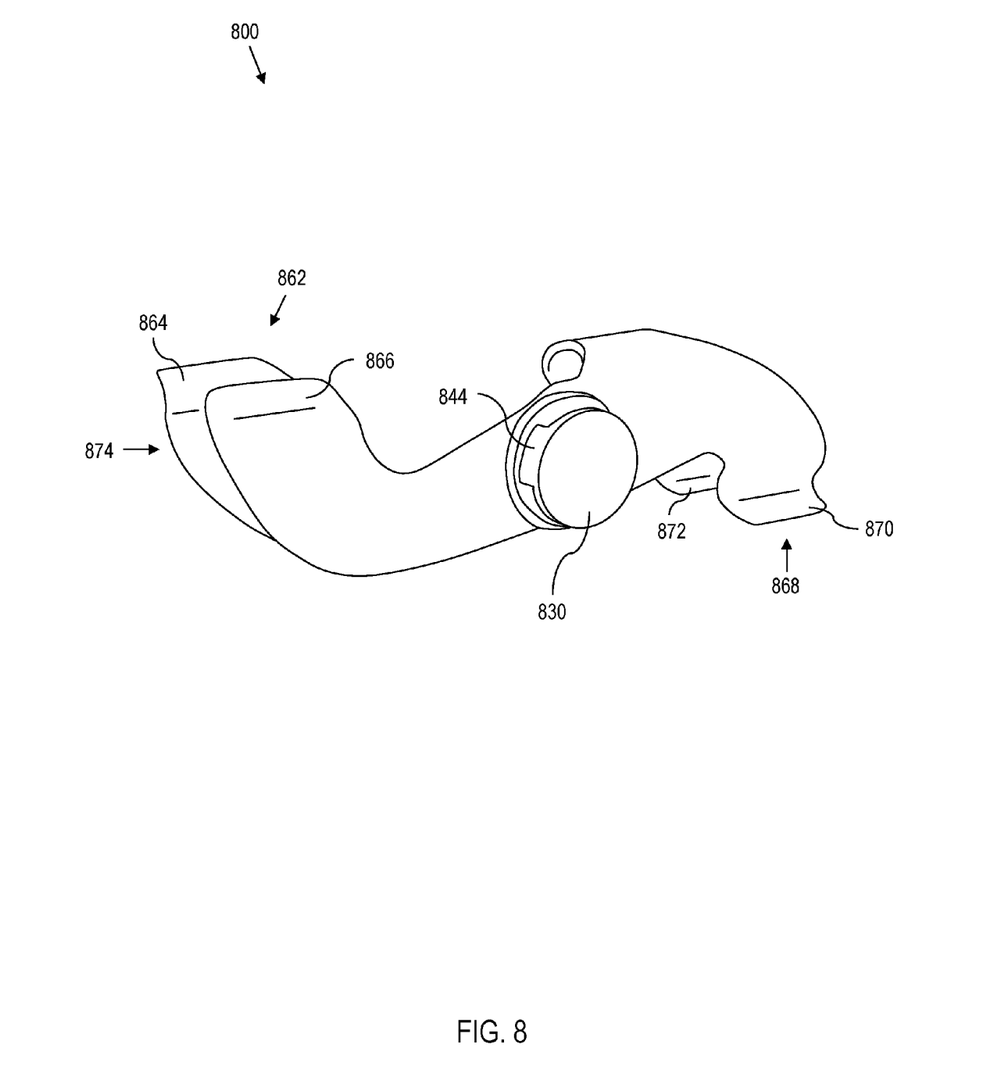
FIG. 8 is a front view of a fishing pole attachment device corresponding to a channel of the hands-free utility device of FIGS. 1-4, according to various aspects of the present disclosure.

FIG. 8 illustrates a further rotatable attachment device 800 that may be used to couple a fishing pole (or any other pole) to the utility device 100 (FIG. 1). As with the cylindrical attachment device 500 (FIG. 5), the fishing-pole attachment device 800 includes a tab 830 and a pin 844. Note that the pin 844 for the fishing-pole attachment device 800 is wider than the pin 544 of the cylindrical attachment device 500 (FIG. 5), the wider pin 844 allowing for less rotation. However, such a wide pin 844 is not required. Further, the fishing-pole attachment device includes a first clamping mechanism 862 with two arms 864, 866 and a second clamping mechanism 868, also with two arms 870 and 872. The two clamping mechanisms 862, 868 create a channel 874 in which a pole may reside. Thus, the utility device may hold the fishing pole rotated back a bit, and when a fish bites the line, the pole will rotate forward indicating that a fish is on the line.

Figure 9:
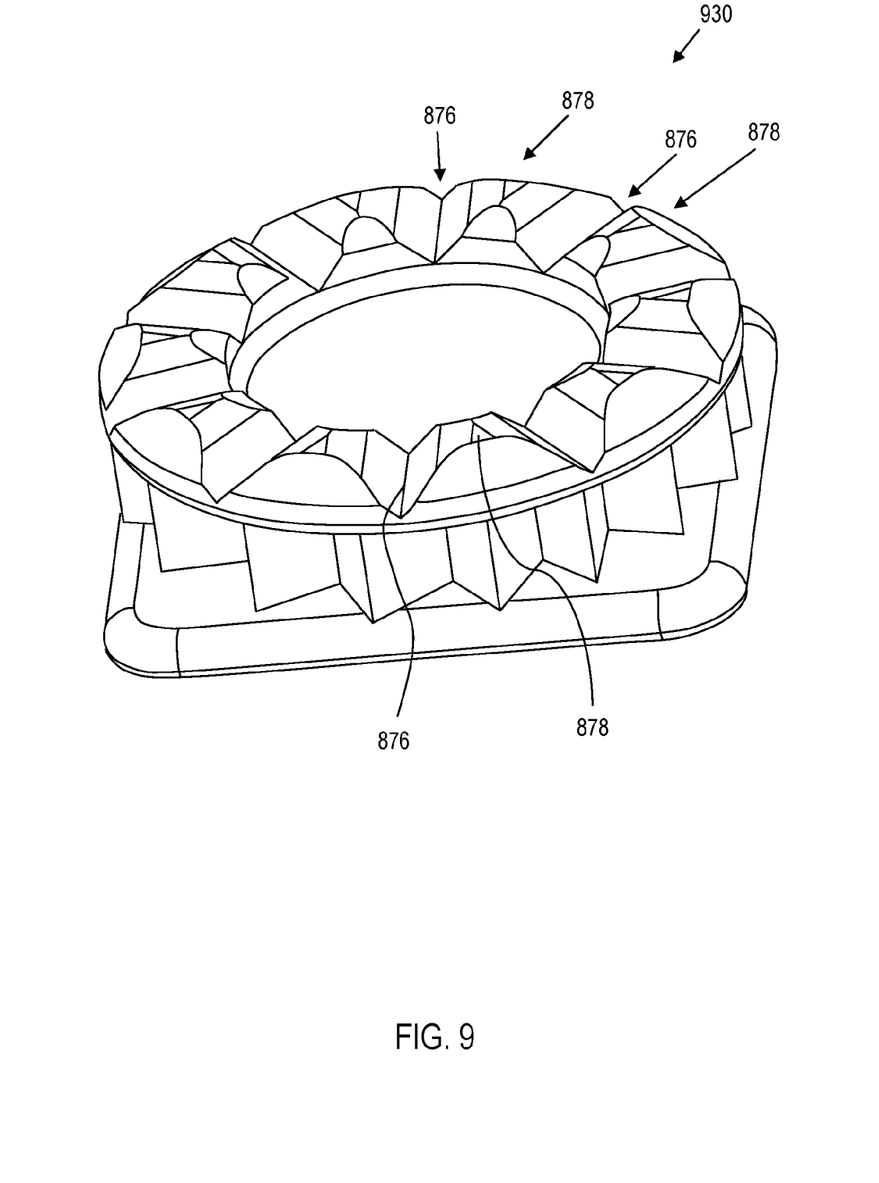
FIG. 9 is an isometric view of an alternate design of a circular tab for an attachment device corresponding to a channel of the hands-free utility device of FIGS. 1-4, according to various aspects of the present disclosure.

FIG. 9 illustrates an alternate embodiment of the tab 930 present on the attachment devices 500, 700, 800. While the embodiments of the tab 530 of FIGS. 5-8 are smooth, the tab 930 of FIG. 9 includes troughs 876 and ridges 878, which may interact with similar troughs and ridges (not shown) in an embodiment of the channel of the utility device 100. Thus, the alternate embodiment of the tab 930 (and corresponding channel) may provide more resistance to rotation such that a user must apply a greater force to rotate the attachment device than the embodiment of FIGS. 5-8.

Figure 10:
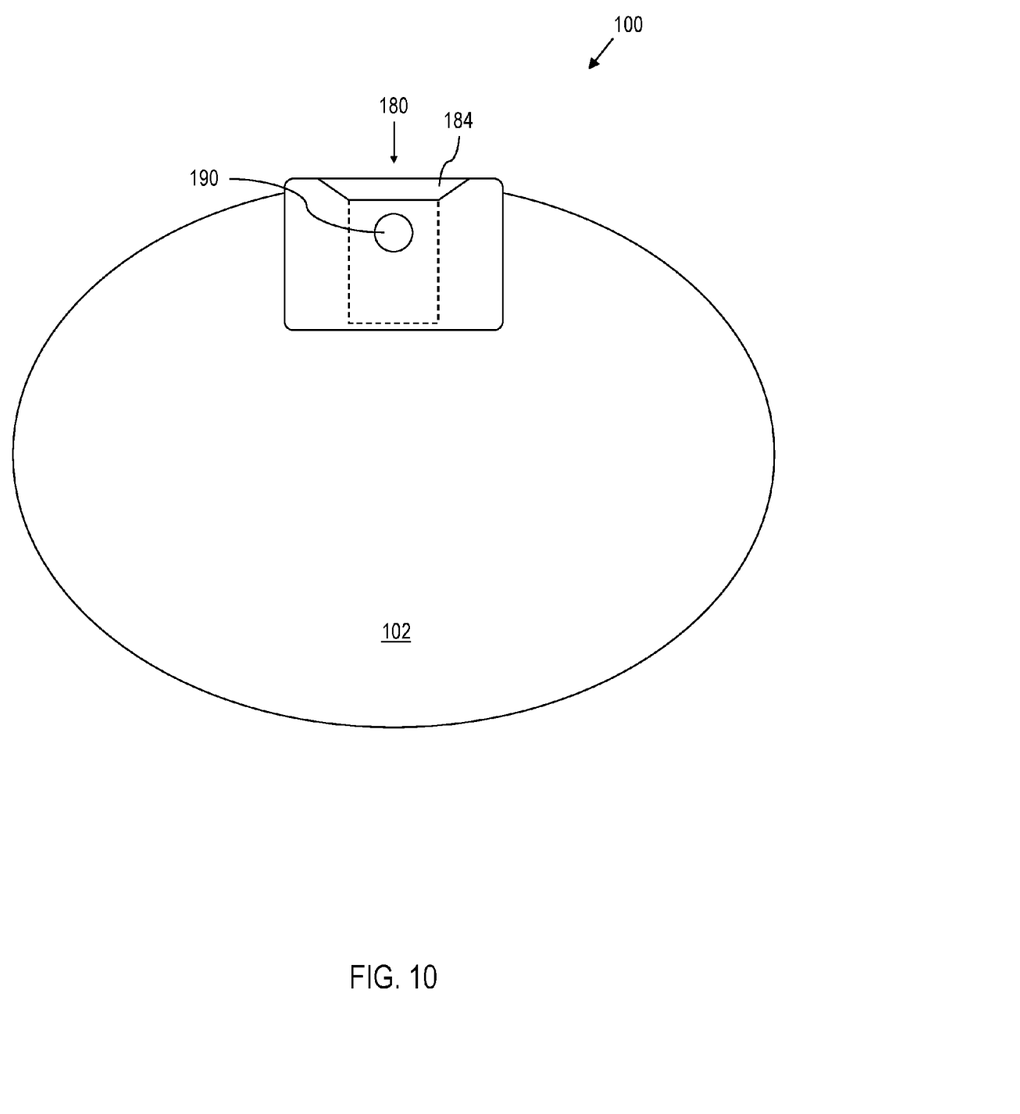
FIG. 10 is a back view of the hands-free utility device of FIGS. 1-4, according to various aspects of the present disclosure.

Turning now to FIGS. 4 and 10, the utility device 100 may include a slot 160 that is slightly offset from the base 102 to accept a fixed (i.e., non-rotatable) attachment piece. The slot 180 includes four sides 182, 184, 186, 188, any combination of which may be sloped toward the slot 180 to guide the fixed attachment piece into the slot. For example, three of the sides 182, 184, 186 may be sloped toward the slot 180. In another configuration, only one of the sides 184 is sloped toward the slot 180. A tab of a fixed attachment device may be placed inside the slot.

Further, the slot 180 may include an interference fit locking mechanism 190. As shown in FIG. 10, the locking mechanism 190 is a hole, so the tab of the corresponding fixed attachment device should have a protrusion to interact with the hole to lock in the attachment device. However, other interference fit locking mechanisms 190 may be used (e.g., a depression in the side 188 of the slot, a protrusion on the side 188 of the slot with a hole or depression on the tab of the attachment device, etc.).

Figure 11:
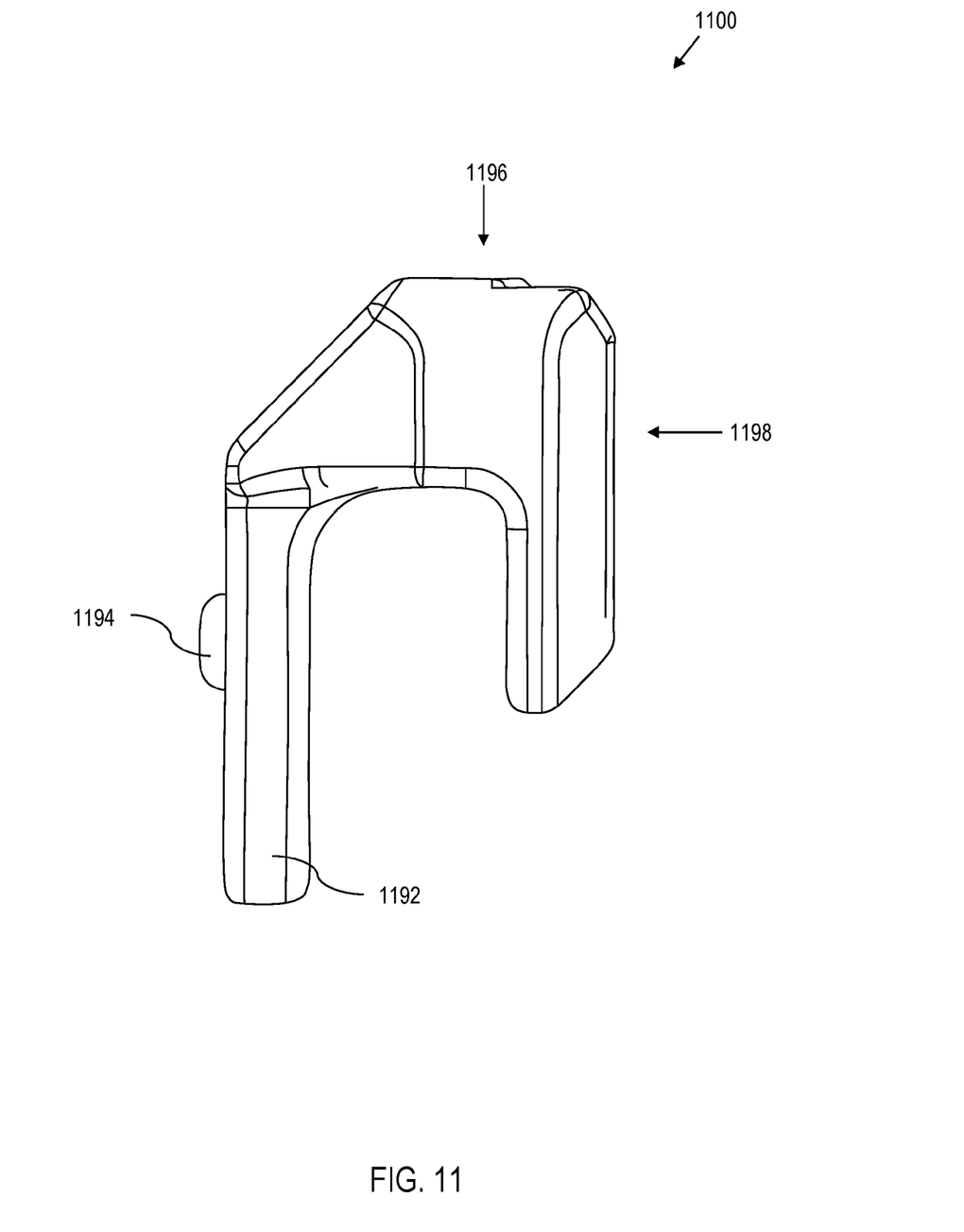
FIG. 11 is a side view of an attachment device corresponding to a slot of the hands-free utility device of FIGS. 1-4, according to various aspects of the present disclosure.

FIG. 11 illustrates a fixed attachment device 1100 that fits into the slot 180 of the utility device 100. Basically, the fixed attachment device 1100 includes a tab 1192 that fits into the slot 180 of the utility device 100 (FIG. 4) and a protrusion 1194 that fits into the interference fit locking mechanism 190 of the utility device 100 (FIG. 4). Further, the fixed attachment device 1100 of FIG. 11 includes an overhang 1196 with a flat front 1198. The user may attach one side of a hook and loop fastener (e.g., the loop side) to the flat front 1198 and the corresponding portion of the hook and loop fastener (e.g., the hook side) to another device (e.g., a cell phone) and attach the device to the utility device 100 via the fixed attachment device 1100.

The utility devices described herein are suitable for carrying items hands-free. The hook may be used for holding items that may easily rest on a hook such as a key ring or a ring of a sunglasses case. Further, the channel may accept a beverage container attachment device, a fishing pole attachment device, or any other rotatable attachment device. For example, a user may attach a beverage container attachment device to the channel and place a beverage container in the beverage container attachment device. Then, the user may rotate the beverage container to remain upright regardless of whether the user is sitting or standing. As another example, the user may attach the fishing pole attachment device to the channel, and when a fish is on the line, the fishing pole may rotate forward to indicate a fish is on the line. Moreover, the slot may hold a fixed attachment device for a mobile phone. As such, any item in the attachment devices or on the hook may be transported hands-free.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:
1. A utility device comprising:
a rigid, ovular base tapered at an edge of the base;
a slot offset from the base, the slot including:
three sloped sides to guide a corresponding fixed attachment piece; and
an interference fit locking mechanism; and
a clip coupled to the base, the clip including:

a hook pivotably selectable between a closed position and an opened position, wherein:
   the hook fits into a recess of the clip and is unable to receive an object when in the closed position; and
   a top of the hook is pivoted away from the clip and a bottom of the hook is pivoted toward the base in the opened position;
an abutment that prevents the hook from opening further than the opened position;
a channel including:
   overhangs along sides of the channel;
   retainers coupled to the overhangs;
   a first set of stoppers radially across from each other; and
   a second set of stoppers radially across from each other;
wherein:
   the channel is adapted to receive a shaft and circular tab of a corresponding rotatable attachment piece;
   the retainers prevent the corresponding rotatable attachment piece from detaching lengthwise from the channel;
   the overhangs prevent the corresponding rotatable attachment piece from detaching depthwise from the channel; and
   the channel allows the corresponding rotatable attachment piece to rotate within the channel limited by the first set of stoppers and the second set of stoppers.

* * * * *